United States Patent
Schmidt et al.

(10) Patent No.: US 11,269,050 B2
(45) Date of Patent: Mar. 8, 2022

(54) RADAR SYSTEM, INTEGRATED RADAR CIRCUIT AND METHOD FOR A RADAR SYSTEM

(71) Applicant: Infineon Technologies AG, Neubiberg (DE)

(72) Inventors: Philipp Schmidt, Wels (AT); Alexander Melzer, Neutillmitsch (AT); Andreas Och, Linz (AT)

(73) Assignee: Infineon Technologies AG

( * ) Notice: Subject to any disclaimer, the term of this patent is extended or adjusted under 35 U.S.C. 154(b) by 348 days.

(21) Appl. No.: 16/577,282

(22) Filed: Sep. 20, 2019

(65) Prior Publication Data
US 2020/0096603 A1  Mar. 26, 2020

(30) Foreign Application Priority Data
Sep. 20, 2018 (DE) .......................... 102018123183.0

(51) Int. Cl.
| | | |
|---|---|---|
| *G01S 7/03* | (2006.01) | |
| *G01S 13/34* | (2006.01) | |
| *G01S 7/35* | (2006.01) | |
| *G01S 13/04* | (2006.01) | |

(52) U.S. Cl.
CPC .............. *G01S 7/032* (2013.01); *G01S 7/35* (2013.01); *G01S 13/34* (2013.01); *G01S 13/04* (2013.01)

(58) Field of Classification Search
CPC ......... H01L 2924/14; H01L 2924/1421; G01S 7/032; G01S 13/931; G01S 13/00; G01S 13/87; G01S 13/04; G01S 2013/93271; G01S 7/03; G01S 7/35
See application file for complete search history.

(56) References Cited

U.S. PATENT DOCUMENTS

| | | | |
|---|---|---|---|
| 10,684,363 B2* | 6/2020 | Starzer | G01S 7/35 |
| 2014/0110840 A1* | 4/2014 | Wojnowski | H01Q 23/00 257/738 |
| 2015/0153445 A1* | 6/2015 | Jansen | G01S 13/931 701/93 |
| 2015/0276918 A1* | 10/2015 | Ramasubramanian | G01S 7/35 342/107 |
| 2017/0090015 A1* | 3/2017 | Breen | G01S 7/032 |
| 2018/0115409 A1* | 4/2018 | Nayyar | G01S 13/343 |
| 2019/0187273 A1* | 6/2019 | Tong | G01S 13/931 |

* cited by examiner

*Primary Examiner* — Olumide Ajibade Akonai
(74) *Attorney, Agent, or Firm* — Design IP

(57) ABSTRACT

A radar system includes a first integrated radar circuit having a plurality of first transmission paths and a local oscillator configured to generate a local oscillator signal. The first integrated radar circuit has a first terminal configured to output an oscillation signal based on the local oscillator signal. The radar system includes a second integrated radar circuit having a second transmission path and a second terminal. The radar system includes a partially reflective element coupled to the first terminal via a first line section and to the second terminal via a second line section. The partially reflective element is configured to reflect back a first portion of the oscillation signal as a reflected signal via the first line section to the first terminal and to pass on a second portion of the oscillation signal as a forward signal via the second line section to the second terminal.

23 Claims, 7 Drawing Sheets

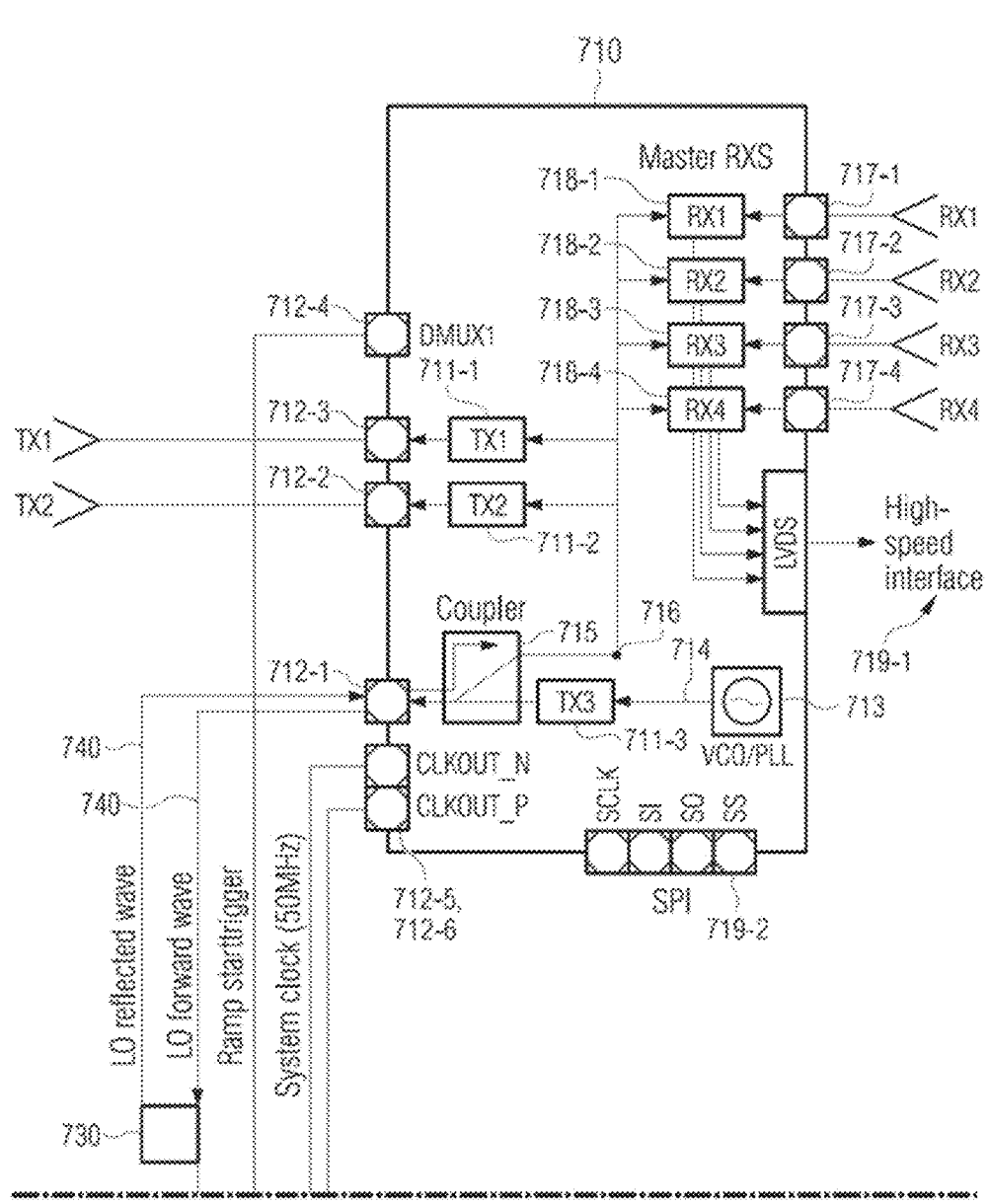

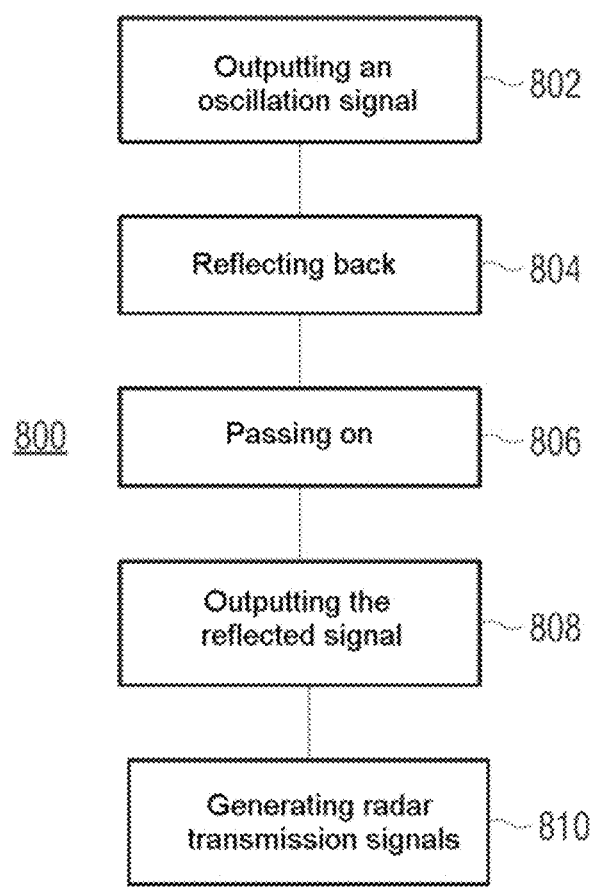

RADAR SYSTEM, INTEGRATED RADAR CIRCUIT AND METHOD FOR A RADAR SYSTEM

FIELD

Exemplary embodiments relate to a radar system, an integrated radar circuit, and a method for a radar system.

BACKGROUND

A multiplicity of transmission and reception channels are normally used for high-resolution radar systems. However, the number of possible transmission and reception channels of a single monolithic microwave integrated circuit (MMIC) is limited. Therefore, a plurality of MMICs are often cascaded, i.e. a plurality of radar transceiver MMICs are coupled, wherein one of the MMICs serves as master and provides the system clock, the trigger line, the radio-frequency transmission signal, etc. In order to enable correct operation of the radar system, the radio-frequency transmission signals of the channels distributed among the individual MMICs need to be synchronized

SUMMARY

There is thus a need to provide an improved technology for the synchronization of integrated radar circuits.

The need can be met by the subject matter of the patent claims.

One exemplary embodiment relates to a radar system. The radar system includes a first integrated radar circuit having a plurality of first transmission paths and a local oscillator configured to generate a local oscillator signal. The first integrated radar circuit additionally has a first terminal configured to output an oscillation signal based on the local oscillator signal. The radar system furthermore includes a second integrated radar circuit having at least one second transmission path and a second terminal. Furthermore, the radar system includes a partially reflective element coupled to the first terminal via a first line section and to the second terminal via a second line section. The partially reflective element is configured to reflect back a first portion of the oscillation signal as a reflected signal via the first line section to the first terminal and to pass on a second portion of the oscillation signal as a forward signal via the second line section to the second terminal. The first integrated radar circuit furthermore includes a directional coupler, which is coupled to the first terminal via a first port and is configured to output the reflected signal via a second port to a signal node of the first integrated radar circuit. The first transmission paths are coupled to the signal node and at least one portion of the first transmission paths is configured to generate radar transmission signals on the basis of the reflected signal.

A further exemplary embodiment relates to an integrated radar circuit. The integrated radar circuit includes a plurality of transmission paths and a local oscillator configured to generate a local oscillator signal. Furthermore, the integrated radar circuit includes a terminal for linking an external element via a line section. The terminal is configured to output an oscillation signal based on the local oscillator signal to the line section and to receive a portion of the oscillation signal reflected by the external element as a reflected signal via the line section. Furthermore, the integrated radar circuit includes a directional coupler, which is coupled to the terminal via a first port and is configured to output the reflected signal via a second port to a signal node of the integrated radar circuit. The transmission paths are coupled to the signal node and at least one portion of the transmission paths is configured to generate radar transmission signals on the basis of the reflected signal.

In addition, one exemplary embodiment relates to a method for a radar system having a first integrated radar circuit including at least a plurality of first transmission paths, a local oscillator and a first terminal, and a second integrated radar circuit including at least one second transmission path and a second terminal. The method includes outputting an oscillation signal based on a local oscillator signal of the local oscillator via the first terminal to a partially reflective element coupled to the first terminal via a first line section and to the second terminal via a second line section. Furthermore, the method includes reflecting back a first portion of the oscillation signal as a reflected signal via the first line section to the first terminal by means of the partially reflective element. Furthermore, the method includes passing on a second portion of the oscillation signal as a forward signal via the second line section to the second terminal by means of the partially reflective element. The method furthermore includes outputting the reflected signal via a second port of a directional coupler of the first integrated radar circuit to a signal node of the first integrated radar circuit. A first port of the directional coupler is coupled to the first line section. Furthermore, the method includes generating radar transmission signals on the basis of the reflected signal by means of at least one portion of the first transmission paths coupled to the signal node.

BRIEF DESCRIPTION OF THE DRAWINGS

Some examples of devices and/or methods are explained in greater detail merely by way of example below with reference to the accompanying figures, in which:

FIGS. 7-1 and 7-2 show a third exemplary embodiment of a radar system; and FIG. 8 shows a flow diagram of one exemplary embodiment of a method for a radar system.

DETAILED DESCRIPTION

Various examples will now be described more thoroughly with reference to the accompanying figures, in which some examples are illustrated. In the figures the thicknesses of lines, layers and/or regions may be exaggerated for elucidation purposes.

While further examples are suitable for various modifications and alternative forms, some specific examples thereof are accordingly shown in the figures and described thoroughly below. However, this detailed description does not limit further examples to the specific forms described. Further examples can cover all modifications, counterparts and alternatives that fall within the scope of the disclosure.

Throughout the description of the figures, identical or similar reference signs refer to identical or similar elements which can be implemented identically or in modified form in a comparison with one another, while they provide the same or a similar function.

It goes without saying that if one element is designated as "connected" or "coupled" to another element, the elements can be connected or coupled directly or via one or more intermediate elements. If two elements A and B are combined using an "or", this should be understood such that all possible combinations are disclosed, i.e. only A, only B, and A and B, unless explicitly or implicitly defined otherwise. An alternative wording for the same combinations is "at least one from A and B" or "A and/or B". The same applies, mutatis mutandis, to combinations of more than two elements.

The terminology used here for describing specific examples is not intended to be limiting for further examples. If a singular form, e.g. "a, an" and "the", is used and the use of only a single element is defined neither explicitly nor implicitly as obligatory, further examples can also use plural elements in order to implement the same function. If a function is described below as being implemented using a plurality of elements, further examples can implement the same function using a single element or a single processing entity. Furthermore, it goes without saying that the terms "comprises", "comprising", "has" and/or "having" in their usage indicate with greater precision the presence of the specified features, integers, steps, operations, processes, elements, components and/or a group thereof, but do not exclude the presence or the addition of one or more other features, integers, steps, operations, processes, elements, components and/or a group thereof.

Unless defined otherwise, all terms (including technical and scientific terms) are used here in their customary meaning in the field with which examples are associated.

Figure 1:
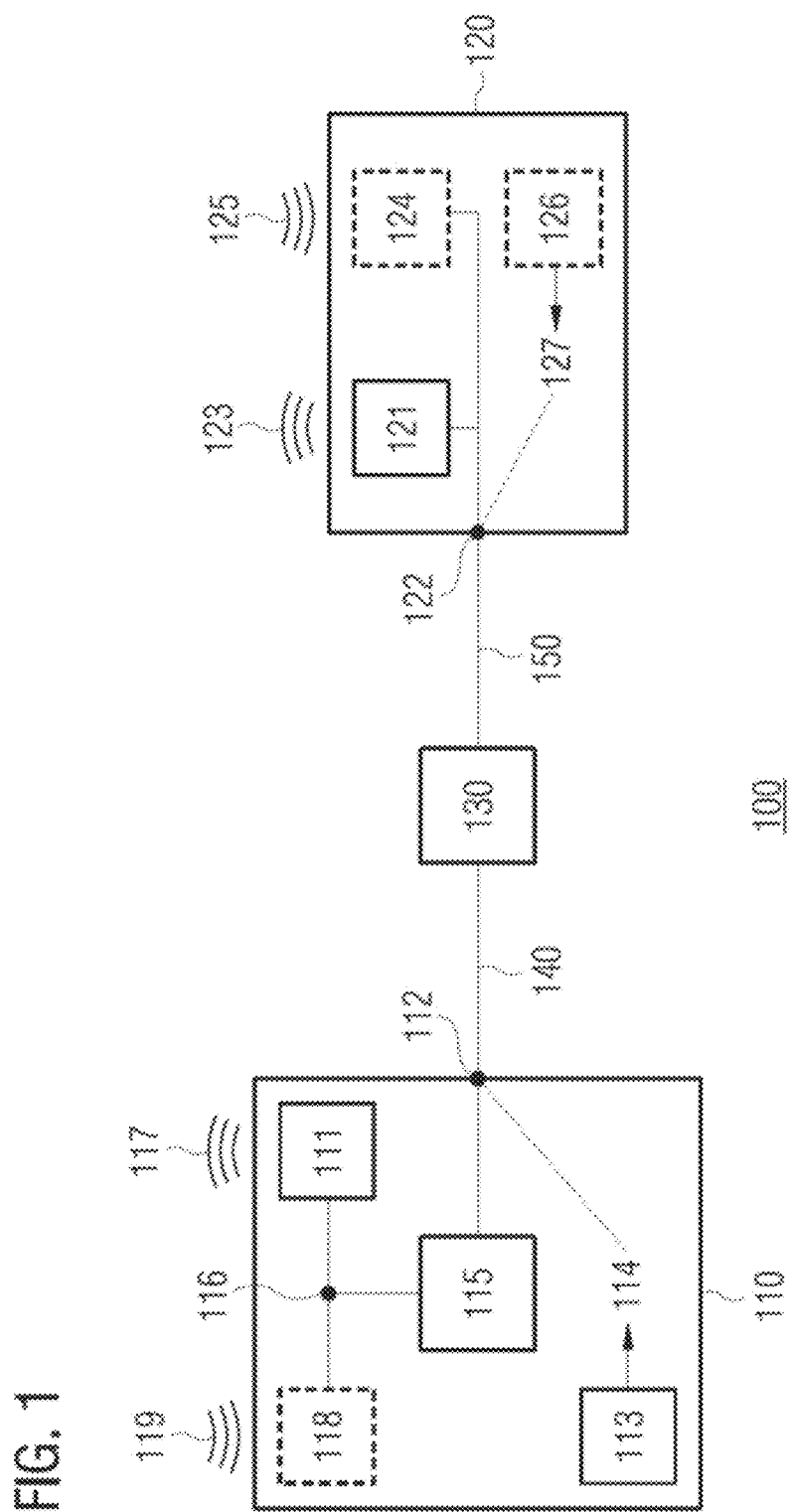
FIG. 1 shows a first exemplary embodiment of a radar system.

FIG. 1 shows a radar system 100 comprising a first integrated radar circuit 110 and a second integrated radar circuit 120. By way of example, the integrated radar circuits 110 and 120 can be embodied as MMICs. The first integrated radar circuit 110 serves as master, while the second integrated radar circuit 120 serves as slave. The two integrated radar circuits 110 and 120 are formed on different semiconductor chips.

The first integrated radar circuit 110 comprises a plurality of first transmission paths 111 in order to generate radar transmission signals 117 (e.g. having a carrier frequency of approximately 77 GHz). The second integrated radar circuit 120, too, comprises at least one second transmission path 121 in order to generate a radar transmission signal 123. A plurality of radar transmission signals can thus be generated by means of the integrated radar circuits 110 and 120 in order to enable high-resolution radar scanning of an environment of the radar system 100.

Furthermore, the first integrated radar circuit 110 comprises a local oscillator 113 configured to generate a local oscillator signal 114. The local oscillator signal 114 can be frequency-modulated for example (e.g. in order to emit chirp signals in the region of 77 GHz). The local oscillator signal 114 serves as a basis for the synchronous generation of the radar transmission signals in the two integrated radar circuits 110 and 120.

For synchronizing the two integrated radar circuits 110 and 120 on the basis of the local oscillator signal 114, the first integrated radar circuit 110 additionally comprises a first terminal 112 configured to output an oscillation signal based on the local oscillator signal 114. The oscillation signal based on the local oscillator signal 114 can be for example the local oscillator signal 114 itself or a signal derived from the local oscillator signal 114. By way of example, the oscillation signal can have a lower frequency than the local oscillator signal 114 and be a divided-down local oscillator signal (e.g. a radio-frequency signal having half or one quarter of the frequency of the local oscillator signal 114). The oscillation signal can likewise be e.g. a power-amplified (and optionally filtered) copy of the local oscillator signal 114. The oscillation signal can be applied to the terminal 112 for example by the local oscillator 113 or by a circuit component of the first integrated radar circuit 110 that generates the oscillation signal on the basis of the local oscillator signal 114.

For coupling the second integrated radar circuit 120 to the first integrated radar circuit 110, the second integrated radar circuit 120 comprises a second terminal 122.

A partially reflective element 130 is coupled between the first integrated radar circuit 110 and the second integrated radar circuit 120. The partially reflective element 130 is coupled to the first terminal 112 via a first line section 140 and to the second terminal 122 via a second line section 150. Correspondingly, the partially reflective element 130 receives the oscillation signal present at the first terminal 112 via the first line section 140. The partially reflective element 130 is thus connected between the terminals 112 and 122. The line sections 140 and 150 can be for example strip lines, waveguides or dielectric waveguides. The line sections 140 and 150 can extend for example on a circuit board or some other carrier on which the radar circuits 110 and 120 are secured.

The partially reflective element 130 is configured to reflect back a first portion of the oscillation signal as a reflected signal via the first line section 140 to the first terminal 112 and to pass on a second portion of the oscillation signal as a forward signal via the second line section 150 to the second terminal 122. In other words: one part of the oscillation signal is reflected back to the first integrated radar circuit 110 by the partially reflective element 130, while another part passes through the partially reflective element 130 and reaches the second integrated radar circuit 120 via the second line section 150.

The first integrated radar circuit 110 comprises a directional coupler 115, which is coupled to the first terminal 112 (or the first line section 140) via a first port and is configured to output the reflected signal via a second port to a signal node 116 of the first integrated radar circuit 110. On account of the directional characteristic of the directional coupler 115, the reflected signal can be output to the signal node 116 substantially without constituents of further signal components present at the first terminal 112. In other words: the directional coupler 115 can enable an output coupling of the reflected signal from the totality of all the signals present at the first terminal 112.

The first transmission paths 111 are coupled to the signal node and can thereby obtain the reflected signal. At least one portion of the first transmission paths 111 is configured to generate radar transmission signals 117 on the basis of the reflected signal. By way of example, in some exemplary embodiments, only one portion of the first transmission paths 111 can be configured (or be driven) to generate radar transmission signals 117 on the basis of the reflected signal. Alternatively, it is also possible for all the transmission paths 111 to be configured to generate radar transmission signals 117 on the basis of the reflected signal. Consequently, the portion of the first transmission paths 111 which generates the radar transmission signals 117 can generate the radar transmission signals 117 in a manner temporally correlated with the reflected signal.

The at least one second transmission path 121 of the second integrated radar circuit 120 is coupled to the second terminal 122 and can thus obtain the forward signal. The at least one second transmission path 121 is configured to generate the radar signal 123 on the basis of the forward signal. By way of example, the received forward signal can be fed to one or more power amplifiers in order to generate the transmission signal 123. If the received forward signal is based on a divided-down local oscillator signal, then a frequency multiplier can be provided in the radar circuit 120 in order to obtain the frequency of the local oscillator signal again. The second transmission path 121 can thus generate the radar transmission signal 123 in a manner temporally correlated with the forward signal.

The two integrated radar circuits 110 and 120 can be synchronized by means of the partial reflection of the oscillation signal in the radio-frequency range since a portion of the oscillation signal is thus respectively provided to both integrated radar circuits 110 and 120. In this case, only a single terminal is necessary in the integrated radar circuit 110 in order to output the oscillation signal used for the synchronization and to receive the reflected portion of said oscillation signal.

Besides the synchronization of transmission paths 111 and 121, the reflected signal and the forward signal can also be used for synchronizing reception paths of the two integrated radar circuits 110 and 120.

By way of example, the first integrated radar circuit 110 can have at least one first reception path 118 coupled to the signal node 115, and the second integrated radar circuit 120 can furthermore have at least one second reception path 124 coupled to the second terminal 122 for the reception and the processing of radar reception signals. Correspondingly, the at least one first reception path 118 is configured to down-convert a received radar reception signal 119 using the reflected signal (i.e. to down-convert the radar reception signal 119 in a manner temporally correlated with the reflected signal), while the at least one second reception path 124 is configured to down-convert a received radar reception signal 125 using the forward signal (i.e. the radar reception signal 125 is down-converted in a manner temporally correlated with the forward signal).

The partially reflective element 130 is configured to generate the reflected signal and the forward signal with a constant phase angle relative to one another. If $\varphi_{11}(f)$ denotes the phase of the reflected signal and $\varphi_{21}(f)$ denotes the phase of the forward signal, the following relationship thus holds true:

$$\frac{\varphi_{11}(f)}{\varphi_{21}(f)} = const. \tag{1}$$

By way of example, the partially reflective element 130 can be configured to generate the reflected signal and the forward signal in phase, such that $\varphi_{11}(f)=\varphi_{21}(f)$. Alternatively, the partially reflective element 130 can be configured to generate the reflected signal with a fixed phase offset c relative to the forward signal, such that $\varphi_{11}(f)=\varphi_{21}(f)+c$.

In order to enable the synchronism of the two integrated radar circuits 110 and 120, the phases of the reflected signal and of the forward signal when they reach the terminals 112 and 122, respectively, should be (as far as possible) identical. The phases of the reflected signal and of the forward signal upon reception of the signals at the terminals 112 and 122, respectively, are determined not only by the partially reflective element 130, but also by the lengths of the two line sections 140 and 150. Correspondingly, the lengths of the first line section 140 and of the second line section 150 can be chosen such that a phase of the reflected signal upon reception at the first terminal 112 is identical to a phase of the forward signal upon reception at the second terminal 122.

By way of example, the first line section 140 and the second line section 150 can have the same electrical length and the same constitution if the partially reflective element 130 generates the reflected signal and the forward signal in phase. In other words: the partially reflective element 130 can be arranged centrally within the two terminals 112 and 122.

If the partially reflective element 130 generates the reflected signal with a phase offset relative to the forward signal, e.g. one of the two line sections 140 and 150 can be longer than the other in order to balance or to compensate for the phase offset generated by the partially reflective element 130. In other words: the partially reflective element 130 can be arranged offset with respect to the center of the line connecting the two terminals 112 and 122.

The partially reflective element 130 can likewise be embodied such that the reflected signal and the forward signal have similar signal strengths. By way of example, the partially reflective element 130 can be configured to partly reflect the oscillation signal in such a way that respective signal strengths of the reflected signal and of the forward signal deviate from one another by less than 90%, 80%, 70%, 60%, 50%, 40%, 30%, 20% or 10%. In some exemplary embodiments, the partially reflective element 130 can be configured to partly reflect the oscillation signal in such a way that respective signal strengths of the reflected signal and of the forward signal are (substantially) identical. If $S_{11}$ describes the scattering parameter of the reflected signal, i.e. the input reflection factor of the partially reflective element 130, and $S_{21}$ describes the scattering parameter of the forward signal, i.e. the forward transmission factor of the partially reflective element 130, the following relationship can thus hold true:

$$S_{11}=S_{21} \tag{2}$$

By way of example, the reflected signal and the forward signal can each have a signal strength of −3 dBm if a power of 0 dBm is present at the first line section 140 (i.e. $S_{11}=S_{21}=-3$ dB).

In some exemplary embodiments, the reflected signal can thus be (substantially) identical to the forward signal, such that the first integrated radar circuit 110 effectively receives the same signal as the second integrated radar circuit 120. The two integrated radar circuits 110 and 120 can thus be synchronized to the same signal. In other words: the master MMIC 110 and the slave MMIC 120 can be phase-synchronized by means of the oscillation signal in the radio-frequency range. The proposed synchronization architecture uses the reflected portion of the oscillation signal as feedback for the master MMIC 110, such that the master MMIC 110 can be kept synchronous with the slave MMIC 120. This also makes it possible, for example, that the channels of the master MMIC 110 and of the slave MMIC 120 can be operated in an MIMO (Multiple In Multiple Out) system. In contrast to existing concepts for self-supply with local oscillation signals, a single terminal at the master MMIC 110 is sufficient for the proposed synchronization architecture.

The oscillation signal can be applied to the first terminal 112 via the directional coupler 115, for example. The directional coupler can be configured, for example, to receive the oscillation signal via a third port from the local oscillator 115 or some other circuit element of the first integrated radar circuit 110 and to output said signal via the first port to the first line section 140 or the first terminal 112. Alternatively, the oscillation signal can for example also be coupled in or applied to the first terminal 112 via a coupling-in element (not illustrated) arranged between the directional coupler 115 and the first terminal 112.

In accordance with some exemplary embodiments, the two integrated radar circuits 110 and 120 can (temporarily or permanently) swap their roles as master and slave, respectively. By way of example, in the case of a defect at the local oscillator 113, the first integrated radar circuit 110 can change from being the master to being the slave and, conversely, the second integrated radar circuit 120 can change from being the slave to being the master. To put it more generally, in a further operating mode of the radar circuit 100 the local oscillator 113 of the first integrated radar circuit 110 can be inactive. The second integrated radar circuit 120 can have a further local oscillator 126, which in the further operating mode is configured to generate a further local oscillator signal 127. The second terminal 122 in the further operating mode is configured to output a further oscillation signal based on the further local oscillator signal. The synchronization of the two integrated radar circuits 110 and 120 can take place analogously to the above-described concept in the further operating mode, too. In this regard, the partially reflective element 130 in the further operating mode can be configured to reflect back a first portion of the further oscillation signal as a further reflected signal via the second line section 150 to the second terminal 122 and to pass on a second portion of the further oscillation signal as a further forward signal via the first line section 140 to the first terminal 112.

One portion of the first transmission paths 111 in the further operating mode can correspondingly be configured to generate the radar transmission signals 117 in a manner temporally correlated with the further forward signal, and the at least one second transmission path 121 in the further operating mode can correspondingly be configured to generate the radar transmission signal 123 in a manner temporally correlated with the further reflected signal. In this regard, the radar system 100 can continue to be operated e.g. even in the event of a failure of the local oscillator 113.

In the exemplary embodiment illustrated in FIG. 1, one slave MMIC is coupled to the master MMIC. In accordance with one exemplary embodiment, it is also possible for a plurality of slave MMICs to be coupled to the master MMIC (e.g. two, three, four or more slave MMICs). This is illustrated by way of example in FIG. 2. In comparison with the radar system 100 illustrated in FIG. 1, the radar system 200 illustrated in FIG. 2 has an additional third integrated radar circuit 270. The third integrated radar circuit 270 comprises a third terminal 272 and at least one third transmission path 271 in order to generate a radar transmission signal 273.

The partially reflective element 230 is coupled to the third terminal 272 via a third line section 260. In order to synchronize the third integrated radar circuit 270 with the other two integrated radar circuits 110 and 120, the partially reflective element 230 is furthermore configured to pass on a third portion of the oscillation signal as a further forward signal via the third line section 260 to the third terminal 272. The at least one third transmission path 271 is coupled to the third terminal 272 and is configured to generate the radar transmission signal 273 in a manner temporally correlated with the further forward signal.

Besides the synchronization of the transmission paths 111, 121 and 271, the reflected signal and the forward signal can also be used for synchronizing reception paths of the integrated radar circuits 110, 120 and 270. By way of example, the third integrated radar circuit 270 can furthermore comprise at least one third reception path 274 which is coupled to the third terminal 272 and is configured to down-convert a radar reception signal 275 using the further forward signal (i.e. to down-convert the radar reception signal 275 in a manner temporally correlated with the further forward signal).

In order to enable a reliable synchronization of all three integrated radar circuits 110, 120 and 270, the partially reflective element 230 is configured to generate the reflected signal, the forward signal and the further forward signal with a constant phase angle relative to one another. By way of example, in some exemplary embodiments, the partially reflective element 230 can be configured to generate the reflected signal, the forward signal and the further forward signal in phase, such that $\varphi_{11}(f)=\varphi_{21}(f)=\varphi_{31}(f)$, wherein $\varphi_{31}(f)$ denotes the phase of the further forward signal. Alternatively, the partially reflective element 230 can be configured to generate the reflected signal, the forward signal and the further forward signal with fixed phase offsets c and d, respectively, relative to one another, such that $\varphi_{11}(f)=\varphi_{21}(f)+c=\varphi_{31}(f)+d$.

The setting of the phases of the reflected signal, of the forward signal and of the further forward signal can once again additionally be determined by way of the lengths of the line sections 140, 150 and 260. Correspondingly, the lengths of the first line section 140, of the second line section 150 and of the third line section 260 can be chosen such that a phase of the reflected signal upon reception at the first terminal 112 is identical to a phase of the forward signal upon reception at the second terminal 122 and to a phase of the further forward signal upon reception at the third terminal 272. By way of example, the line sections 140, 150 and 260 can have the same length. Alternatively, one or more of the line sections 140, 150 and 260 can be chosen to be longer than the other line sections 140, 150 and 260.

With regard to the signal strengths of the reflected signal, of the forward signal and of the further forward signal, the explanation given above in association with FIG. 1 is substantially applicable. By way of example, the partially reflective element 230 can be configured to partly reflect the oscillation signal in such a way that respective signal strengths of the reflected signal, of the forward signal and of the further forward signal deviate from one another by less than 90%, 80%, 70%, 60%, 50%, 40%, 30%, 20% or 10%. In some exemplary embodiments, the partially reflective element 230 can be configured to partly reflect the oscillation signal in such a way that respective signal strengths of the reflected signal, of the forward signal and of the further forward signal are (substantially) identical. By way of example, the following relationship can hold true:

$$S_{11}=S_{21}=S_{31}=-3 \text{ dB} \tag{3},$$

wherein $S_{31}$ denotes the scattering parameter of the further forward signal, i.e. the forward transmission factor of the partially reflective element 230 toward the third terminal 272.

Figure 2:
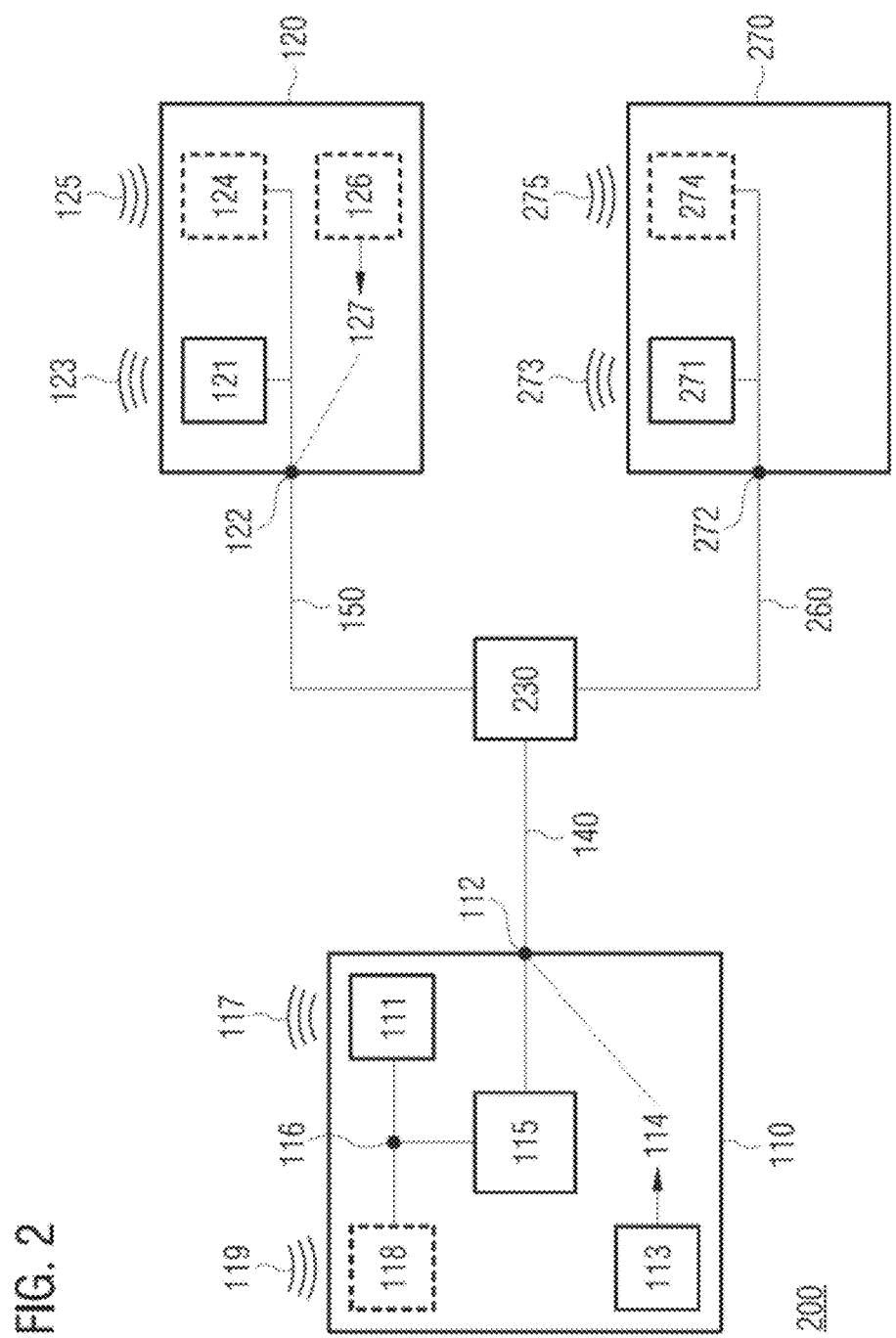
FIG. 2 shows a second exemplary embodiment of a radar system.

As already described in association with FIG. 2 for the second integrated radar circuit 120, in some exemplary embodiments, the third integrated radar circuit 270, too, can be operated as master instead of as slave, i.e. can generate a local oscillation signal and output an oscillation signal based thereon to the partially reflective element 230 for the synchronization of the integrated radar circuits 110, 120 and 270. In order to avoid unnecessary repetitions, therefore, reference is made to the above explanations concerning the second integrated radar circuit 120, which correspondingly also hold true for the third integrated radar circuit 270.

In accordance with some exemplary embodiments, the integrated radar circuits 110, 120 and 270 illustrated in FIGS. 1 and 2 can be constructed identically (e.g. be identical to MMICs) and differ merely with regard to the operating mode used (master and slave, respectively). In other exemplary embodiments, however, different MMICs can also be used.

Some exemplary directional couplers which can be used for the proposed synchronization architecture are described below in association with FIGS. 3 to 5.

Figure 3:
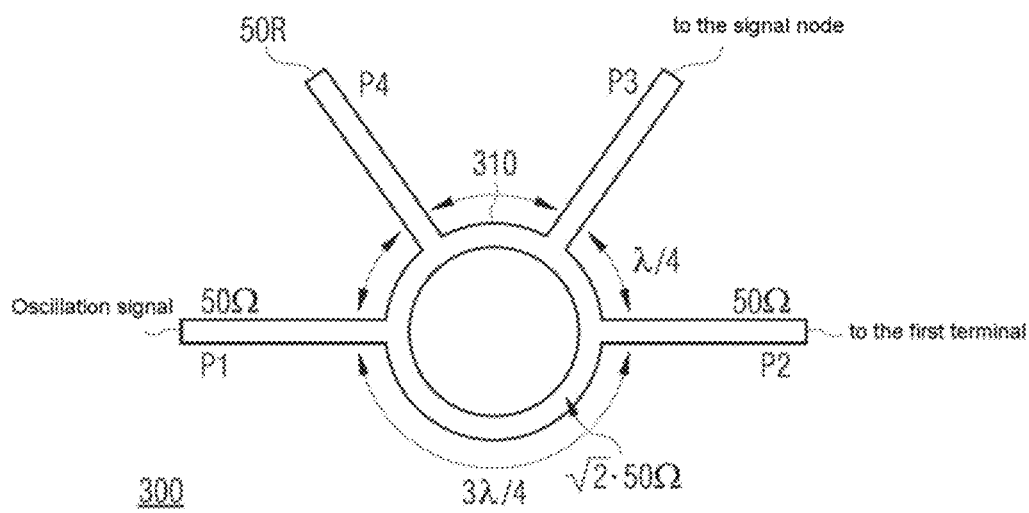
FIG. 3 shows a first exemplary embodiment of a directional coupler.

FIG. 3 shows a rat-race coupler 300 having a ring conductor 310 and four ports P1, P2, P3 and P4. The oscillation signal is present at the port P1 (i.e. the port P1 is coupled to the source of the oscillation signal), while the port P2 is coupled to the first terminal of the first integrated radar circuit or the partially reflective element. The port P3 is coupled to the signal node of the first integrated radar circuit and the port P4 is isolated. The distances between the ports P1 and P4, P4 and P3, and P4 and P2, are in each case ¼ of the wavelength λ used (i.e. the wavelength of the oscillation signal). The distance between the ports P1 and P2 is ¾ of the wavelength λ. Good isolation between the ports P1 and P3 is correspondingly provided, such that the scattering parameters $S_{13}=S_{31}$ are very low. Substantially only the reflected signal received via the port P2 is thus present at the port P3.

Figure 4:
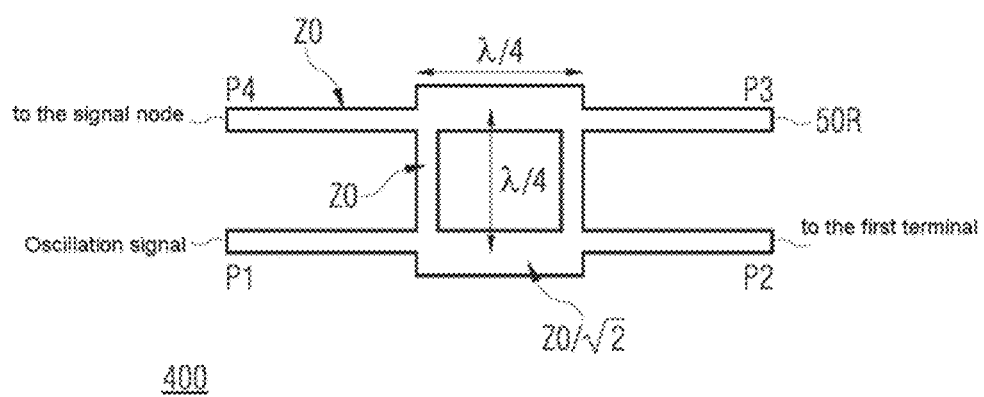
FIG. 4 shows a second exemplary embodiment of a directional coupler.
Figure 5:
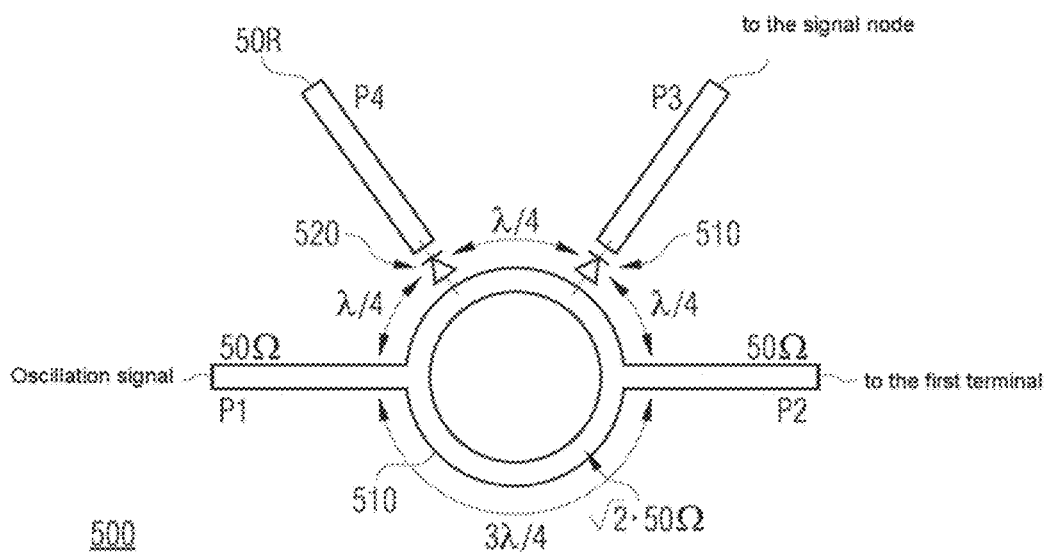
FIG. 5 shows a third exemplary embodiment of a directional coupler.

FIG. 4 shows a branch-line coupler 400 having four ports P1, P2, P3 and P4. The oscillation signal is present at the port P1 (i.e. the port P1 is coupled to the source of the oscillation signal), while the port P2 is coupled to the first terminal of the first integrated radar circuit or the partially reflective element. The port P3 is isolated and the port P4 is coupled to the signal node of the first integrated radar circuit. The distances between the ports are in each case ¼ of the wavelength λ used. Good isolation between the ports P1 and P4 is correspondingly provided, such that the scattering parameters $S_{14}=S_{41}$ are very low. Substantially only the reflected signal received via the port P2 is thus present at the port P4.

The directional couplers shown in FIGS. 3 and 4 thus both have good isolation between the ports for feeding in the oscillation signal and branching off the reflected signal. A further directional coupler, which can make possible lower signal losses in comparison with the directional couplers shown in FIGS. 3 and 4, is illustrated in FIG. 5. FIG. 5 shows a further rat-race coupler 500, wherein, in comparison with the rat-race coupler 300, a biasable PIN diode 520 (Positive Intrinsic Negative Diode) is arranged between the third port P3, which is coupled to the signal node, and the ring conductor 510. Via a bias voltage circuit (not illustrated), a bias voltage can be applied to the PIN diode 520, such that the PIN diode 520 can be operated as a controllable resistor. For this purpose, a corresponding control logic for setting purposes can be connected to the PIN diode 520. The PIN diode 520 can thus be used as an amplitude regulator for the reflected signal present at the port P3. The PIN diode 520 can likewise also be used as a radio-frequency switch and can thus separate the channels P3 and P4 from the switching circuit via a control logic. Consequently, less power is lost through the structure itself and it is possible to use the channel as a transmission channel as well. In other exemplary embodiments, other active elements can also be provided.

A biasable PIN diode 530 is likewise arranged between the isolated, fourth port P4 of the rat-race coupler 500 and the ring conductor 510.

However, the directional coupler used for the proposed synchronization architecture is not restricted to the directional couplers described above in association with FIGS. 3 to 5. Rather, any other suitable directional coupler can also be used.

Figure 6:
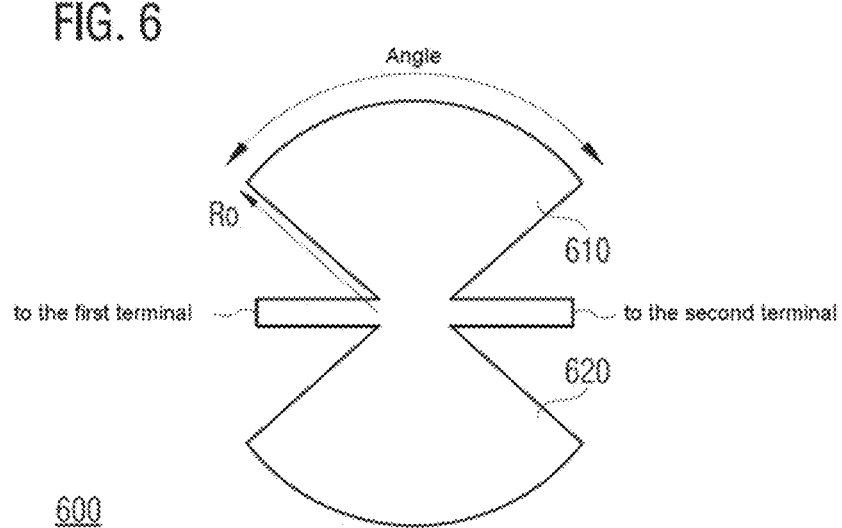
FIG. 6 shows one exemplary embodiment of a partially reflective element.

Another exemplary implementation for the partially reflective element is subsequently shown in FIG. 6. By way of example, the partially reflective element can be embodied as a butterfly stub 600. By way of the setting of the radius Ro and the angle of the circle-segment-shaped stubs 610 and 620, a desired impedance mismatch can be generated in the lines connecting the integrated radar circuits in order thus to reflect back a portion of the oscillation signal arriving from the first terminal with the desired phase and/or signal strength characteristics and to allow a further portion of the arriving oscillation signal with the desired phase and/or signal strength characteristics to pass to the second terminal.

However, the partially reflective element used for the proposed synchronization architecture is not restricted to the butterfly stub 600. Rather, any other suitable element can also be used (e.g. a coupler or power divider).

In some exemplary embodiments, the partially reflective element can be formed exclusively by passive components. In this case, the reflection can result as a consequence of a geometric structure that is adapted with respect to the wavelengths of the oscillation signal. By way of example, a ring structure or an impedance mismatch structure which differs from the line sections can be used in order to achieve both a partial reflection and passing on in the forward direction by means of suitable choice of the geometric dimensions. By comparison with partially reflective elements having active components, it is possible in this way to achieve greater robustness and to reduce a probability of failure of the partially reflective element.

Figures 2, 7:
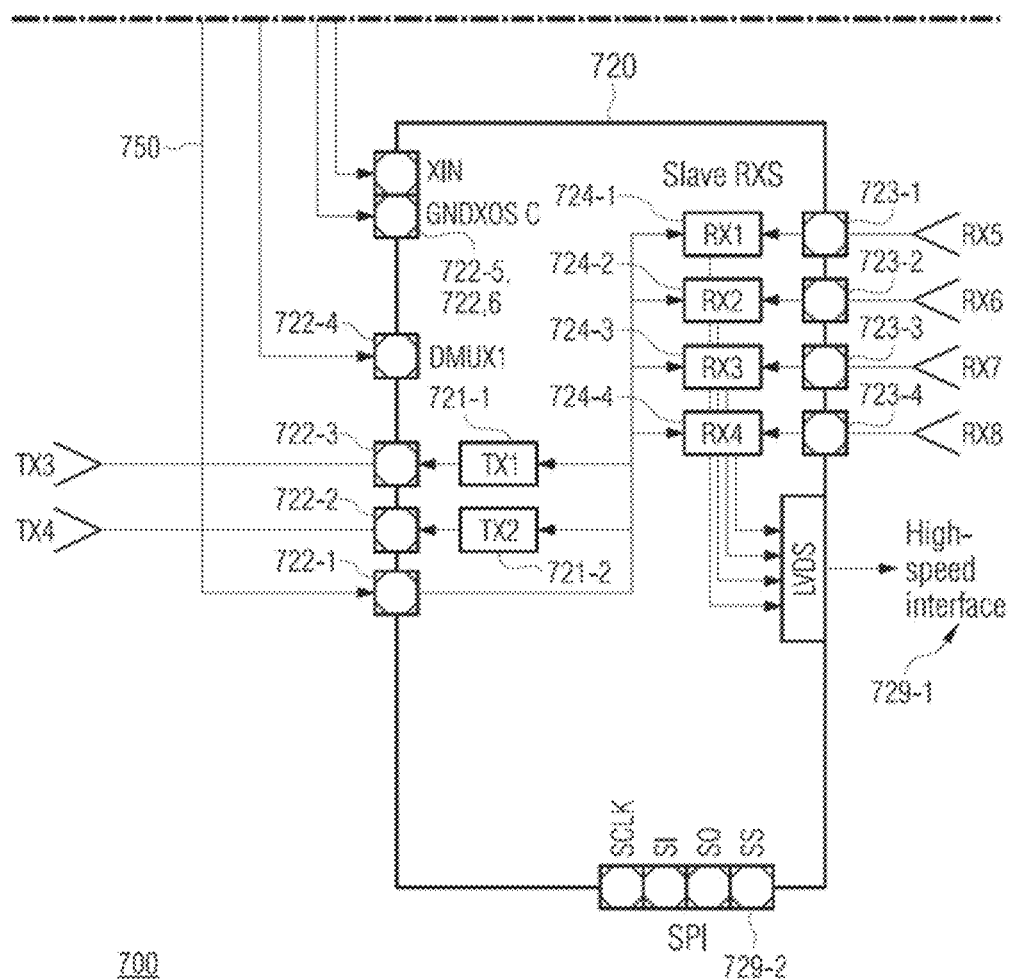

FIGS. 7-1 and 7-2 shows a further exemplary embodiment of a radar system. FIGS. 7-1 and 7-2 illustrate one radar system 700 extended across two sheets. As such, lines that terminate at the dashed-line in one figure are continued at the dashed-line in the other figure. The radar system 700 comprises a first integrated radar circuit 710 and a second integrated radar circuit 720. The first integrated radar circuit 710 serves as master, while the second integrated radar circuit 720 serves as slave.

The first integrated radar circuit 710 comprises a plurality of first transmission paths 711-1, 711-2 and 711-3 and a plurality of first reception paths 714-1, 714-2, 714-3 and 714-4. The second integrated radar circuit 720 likewise comprises a plurality of second transmission paths 721-1 and 721-2 and a plurality of second reception paths 724-1, 724-2, 724-3 and 724-4.

Furthermore, the first integrated radar circuit 710 comprises a local oscillator 713 configured to generate a local oscillator signal 714.

For synchronizing the two integrated radar circuits 710 and 720 on the basis of the local oscillator signal 714, the first integrated radar circuit 710 additionally comprises a first terminal 712-1 configured to output an oscillation signal based on the local oscillator signal 714. The first terminal 712-1 is coupled to the local oscillator 713 via the first transmission path 711-1. In other words: one of the first transmission paths 711-1, 711-2 and 711-3 is coupled to the first terminal 712-1 and is configured to apply the oscillation signal based on the local oscillator signal 714 to the first terminal 712-1. By way of example, the first transmission path 711-1 can filter and amplify the local oscillator signal 714 and apply the local oscillator signal that has been processed in this way as oscillation signal to the first terminal 712-1. The oscillation signal is applied to the first terminal 712-1 via a directional coupler 715, which is coupled to the first terminal 712-1 via a first port and is coupled to the first transmission path 711-1 via a third port.

For coupling the second integrated radar circuit 720 to the first integrated radar circuit 710, the second integrated radar circuit 720 comprises a second terminal 722-1.

A partially reflective element 730 is coupled between the first integrated radar circuit 710 and the second integrated radar circuit 720. The partially reflective element 730 is coupled to the first terminal 712 via a first line section 740 and to the second terminal 722-1 via a second line section 750. Correspondingly, the partially reflective element 730 receives the oscillation signal present at the first terminal 712 via the first line section 740.

The partially reflective element 730 is configured to reflect back a first portion of the oscillation signal as a reflected signal via the first line section 740 to the first terminal 712 and to pass on a second portion of the oscillation signal as a forward signal via the second line section 750 to the second terminal 722. In other words: one part of the oscillation signal is reflected back to the first integrated radar circuit 710 by the partially reflective element 730, while another part passes through the partially reflective element 730 and reaches the second integrated radar circuit 720 via the second line section 750.

Although the first line section 740 is represented by two lines in FIG. 7, the first line section 740 is a single signal line. The representation of the first line section 740 by two lines was chosen in order to illustrate that both a forward component (namely the oscillation signal) and a backward component (namely the reflected-back portion of the oscillation signal) are transferred simultaneously via the first line section 740 between the first terminal 712-1 and the partially reflective element 730.

Via a second port of the directional coupler 115, the reflected signal is output to a signal node 716 of the first integrated radar circuit 710. Output coupling of the reflected signal from the totality of all the signals present at the first terminal 112 is thus carried out by means of the directional coupler 115.

The other first transmission paths 711-2 and 711-3 are likewise coupled to the signal node 716 and obtain the reflected signal via the latter. Consequently, the first transmission paths 711-2 and 711-3 can generate radar transmission signals in a manner temporally correlated with the reflected signal and output them via terminals 712-2 and 712-3, respectively, to transmission antennas for emission into the surroundings. Moreover, the first reception paths 714-1, 714-2, 714-3 and 714-4 are coupled to the signal node 716 and thus obtain the reflected signal. Consequently, the first reception paths 714-1, 714-2, 711-3 and 714-4 can down-convert radar reception signals received from reception antennas via terminals 717-1, 717-2, 717-3 and 717-4 using the reflected signal or can down-convert the radar reception signals in a manner temporally correlated with the reflected signal.

The second transmission paths 721-1 and 721-2 of the second integrated radar circuit 720 are coupled to the second terminal 722-1 and thus obtain the forward signal. The second transmission paths 721-1 and 721-2 can thus generate radar transmission signals in a manner temporally correlated with the forward signal and output them via terminals 722-2 and 722-3, respectively, to transmission antennas for emission into the surroundings. Furthermore, the second reception paths 724-1, 724-2, 724-3 and 724-4 are coupled to the second terminal 722-1 and obtain the forward signal via the latter. Consequently, the second reception paths 724-1, 724-2, 724-3 and 724-4 can down-convert radar reception signals received from reception antennas via terminals 723-1, 723-2, 723-3 and 723-4 using the forward signal or can down-convert the radar reception signals in a manner temporally correlated with the forward signal.

As already explained above in association with FIG. 1, the reflected signal can be (substantially) identical to the forward signal, such that the first integrated radar circuit 710 effectively receives the same signal as the second integrated radar circuit 720. The two integrated radar circuits 710 and 720 can thus be synchronized or phase-synchronized to (substantially) the same signal in the radio-frequency range. In contrast to existing concepts for self-supply with local oscillation signals, a single terminal at the integrated radar circuit 710 is sufficient for the proposed synchronization architecture.

Besides the oscillation signal for the phase synchronization in the radio-frequency range, the two integrated radar circuits 710 and 720 can also exchange one or more further signals for synchronization. By way of example, the first integrated radar circuit 710 can output a system clock via further terminals 712-5 and 712-6, which are received by the second integrated radar circuit 720 via terminals 722-5 and 722-6 coupled to the terminals 712-5 and 712-6. Correspondingly, both integrated radar circuits 710 and 720 can operate with the same system clock. Likewise, via a further terminal 712-4, the first integrated radar circuit 710 can output a trigger signal for ramping up the radar transmission signals in the frequency range, which trigger signal is received via a terminal 722-4 of the second integrated radar circuit 720, said terminal being coupled to the terminal 712-4. Correspondingly, ramping up the radar transmission signals can be carried out synchronously in both integrated radar circuits 710 and 720.

The two integrated radar circuits 710 and 720 can additionally have further terminal, such as, for instance, a (high-speed) interface 719-1 and 729-1, respectively, for outputting the down-converted radar reception signals or serial buses (e.g. a serial peripheral interface) for exchanging other data.

In some exemplary embodiments, the integrated radar circuits 710 and 720 can likewise also be operated by themselves. By way of example, the first integrated radar circuit 710 can be used by itself (i.e. without the integrated radar circuit 720). In this operating mode, a synchronization of the first integrated radar circuit 710 with the second integrated radar circuit is not necessary. Correspondingly, the first transmission path 711-1 can also be used for generating a radar transmission signal in this operating mode.

By way of example, the first integrated radar circuit 720 can furthermore comprise a switch (not shown) configured to couple the local oscillator 713 to the signal node 716 in the further operating mode, such that all the first transmission paths 711-1, 711-2 and 711-3 then receive the local oscillator signal 714. Correspondingly, the first transmission path 711-1 in the further operating mode can be configured to generate a radar transmission signal based on the local oscillator signal 714 and to output it to the first terminal 712-1. In the further operating mode, the first terminal 712-1 is coupled to a transmission antenna instead of the partially reflective element 730. The other transmission paths 711-2 and 711-3 in the further operating mode are configured to generate the radar transmission signals based on the local oscillator signal 714. Correspondingly, during individual operation of the first integrated radar circuit 710, all the transmission paths can be used for generating radar transmission signals.

In accordance with some exemplary embodiments, the integrated radar circuits 710, 720 can be structured identically (e.g. be identical MMICs) and differ merely with regard to the operating mode used (master and slave, respectively). By way of example, the second integrated radar circuit 720 can also have a local oscillator and/or a further transmission path, which is (are) coupled to the second terminal 722-1 via a directional coupler, such that, analogously to the above explanations for the first integrated radar circuit 710, the second terminal 722-1 can be used both for receiving the forward signal in cascaded operation and for outputting a radar transmission signal during individual operation of the second integrated radar circuit 720.

In order once again to summarize the above-described aspects concerning the synchronization of integrated radar circuits, FIG. 8 also shows a flow diagram of a method 800 for a radar system. The radar system comprises a first integrated radar circuit, comprising at least a plurality of first transmission paths, a local oscillator and a first terminal, and a second integrated radar circuit comprising at least one second transmission path and a second terminal.

The method 800 comprises outputting 802 an oscillation signal based on a local oscillator signal of the local oscillator via the first terminal to a partially reflective element coupled to the first terminal via a first line section and to the second terminal via a second line section. Furthermore, the method 800 comprises reflecting back 804 a first portion of the oscillation signal as a reflected signal via the first line section to the first terminal by means of the partially reflective element. Furthermore, the method 800 comprises passing on 806 a second portion of the oscillation signal as a forward signal via the second line section to the second terminal by means of the partially reflective element. The method 800 furthermore comprises outputting 808 the reflected signal via a second port of a directional coupler of the first integrated radar circuit to a signal node of the first integrated radar circuit. A first port of the directional coupler is coupled to the first terminal. Furthermore, the method 800 comprises generating 810 radar transmission signals on the basis of the reflected signal by means of at least one portion of the first transmission paths coupled to the signal node.

Further details and aspects of the method have been described above in association with further exemplary embodiments (e.g. FIGS. 1 to 7). The method can comprise one or more optional features in accordance with the further exemplary embodiments.

The exemplary embodiments described herein can be summarized as follows:

Some exemplary embodiments relate to a radar system. The radar system comprises a first integrated radar circuit having a plurality of first transmission paths and a local oscillator configured to generate a local oscillator signal. The first integrated radar circuit additionally has a first terminal configured to output an oscillation signal based on the local oscillator signal. The radar system furthermore comprises a second integrated radar circuit having at least one second transmission path and a second terminal. Furthermore, the radar system comprises a partially reflective element coupled to the first terminal via a first line section and to the second terminal via a second line section. The partially reflective element is configured to reflect back a first portion of the oscillation signal as a reflected signal via the first line section to the first terminal and to pass on a second portion of the oscillation signal as a forward signal via the second line section to the second terminal. The first integrated radar circuit furthermore comprises a directional coupler, which is coupled to the first terminal via a first port and is configured to output the reflected signal via a second port to a signal node of the first integrated radar circuit. The first transmission paths are coupled to the signal node and at least one portion of the first transmission paths is configured to generate radar transmission signals on the basis of the reflected signal.

In accordance with some exemplary embodiments, the portion of the first transmission paths is configured to generate the radar transmission signals in a manner temporally correlated with the reflected signal, wherein the at least one second transmission path is coupled to the second terminal and configured to generate a radar transmission signal in a manner temporally correlated with the forward signal.

In some exemplary embodiments, the first integrated radar circuit furthermore comprises at least one first reception path which is coupled to the signal node and is configured to down-convert a radar reception signal using the reflected signal.

In accordance with some exemplary embodiments, the second integrated radar circuit furthermore comprises at least one second reception path which is coupled to the second terminal and is configured to down-convert a radar reception signal using the forward signal.

In some exemplary embodiments, the partially reflective element is configured to generate the reflected signal and the forward signal with a constant phase angle relative to one another.

In accordance with some exemplary embodiments, the partially reflective element is configured to generate the reflected signal and the forward signal in phase.

In some exemplary embodiments, the lengths of the first line section and of the second line section are chosen such that a phase of the reflected signal upon reception at the first terminal is identical to a phase of the forward signal upon reception at the second terminal.

By way of example, in accordance with some exemplary embodiments, the first line section and the second line section have the same length.

In some exemplary embodiments, respective signal strengths of the reflected signal and of the forward signal differ from one another by less than 50%.

By way of example, in accordance with some exemplary embodiments, respective signal strengths of the reflected signal and of the forward signal are identical.

In some exemplary embodiments, the partially reflective element comprises exclusively passive components.

In accordance with some exemplary embodiments, the directional coupler is a rat-race coupler, wherein a biasable PIN diode is arranged between the second port of the rat-race coupler and the ring conductor of the rat-race coupler.

In some exemplary embodiments, one of the first transmission paths is coupled to the first terminal via the directional coupler and is configured to apply the oscillation signal based on the local oscillator signal to the first terminal.

In accordance with some exemplary embodiments, the directional coupler is configured to receive the oscillation signal from the local oscillator via a third port and to output it to the first line via the first port.

In some exemplary embodiments, the radar system furthermore comprises a third integrated radar circuit having at least one third transmission path and a third terminal, wherein the partially reflective element is coupled to the third terminal via a third line section. The partially reflective element is furthermore configured to pass on a third portion of the oscillation signal as a further forward signal via the third line section to the third terminal. The at least one third transmission path is coupled to the third terminal and is configured to generate a radar transmission signal in a manner temporally correlated with the further forward signal.

In accordance with some exemplary embodiments, the partially reflective element is configured to generate the reflected signal, the forward signal and the further forward signal with a constant phase angle relative to one another.

By way of example, in some exemplary embodiments, the partially reflective element is configured to generate the reflected signal, the forward signal and the further forward signal in phase.

In some exemplary embodiments, the third integrated radar circuit furthermore comprises at least one third reception path which is coupled to the third terminal and is configured to down-convert a radar reception signal using the further forward signal.

In accordance with some exemplary embodiments, in a further operating mode the local oscillator of the first integrated radar circuit is inactive, wherein the second integrated radar circuit has a further local oscillator, which in the further operating mode is configured to generate a further local oscillator signal. The second terminal in the further operating mode is configured to output a further oscillation signal based on the further local oscillator signal. The partially reflective element in the further operating mode is configured to reflect back a first portion of the further oscillation signal as a further reflected signal via the second line section to the second terminal and to pass on a second portion of the further oscillation signal as a further forward signal via the first line section to the first terminal.

In some exemplary embodiments, the portion of the first transmission paths in the further operating mode is configured to generate the radar transmission signals in a manner temporally correlated with the further forward signal, wherein the at least one second transmission path in the further operating mode is configured to generate the radar transmission signal in a manner temporally correlated with the further reflected signal.

Further exemplary embodiments relate to an integrated radar circuit. The integrated radar circuit comprises a plurality of transmission paths and a local oscillator configured to generate a local oscillator signal. Furthermore, the integrated radar circuit comprises a terminal for linking an external element via a line section. The terminal is configured to output an oscillation signal based on the local oscillator signal to the line section and to receive a portion of the oscillation signal reflected by the external element as a reflected signal via the line section. Furthermore, the integrated radar circuit comprises a directional coupler, which is coupled to the terminal via a first port and is configured to output the reflected signal via a second port to a signal node of the integrated radar circuit. The transmission paths are coupled to the signal node and at least one portion of the transmission paths is configured to generate radar transmission signals on the basis of the reflected signal.

In accordance with some exemplary embodiments, one of the transmission paths is coupled to the terminal via the directional coupler and is configured to apply the oscillation signal based on the local oscillator signal to the terminal.

In some exemplary embodiments, the integrated radar circuit furthermore comprises a switch configured to couple the local oscillator to the signal node in a further operating mode. Said one of the transmission paths in the further operating mode is configured to generate a radar transmission signal on the basis of the local oscillator signal and to output it to the terminal. The other transmission paths in the further operating mode are configured to generate the radar transmission signals on the basis of the local oscillator signal.

In accordance with some exemplary embodiments, the integrated radar circuit furthermore comprises at least one reception path which is coupled to the signal node and is configured to down-convert a radar reception signal using the reflected signal.

In addition, exemplary embodiments relate to a method for a radar system having a first integrated radar circuit comprising at least a plurality of first transmission paths, a local oscillator and a first terminal, and a second integrated radar circuit comprising at least one second transmission path and a second terminal. The method comprises outputting an oscillation signal based on a local oscillator signal of the local oscillator via the first terminal to a partially reflective element coupled to the first terminal via a first line section and to the second terminal via a second line section. Furthermore, the method comprises reflecting back a first portion of the oscillation signal as a reflected signal via the first line section to the first terminal by means of the partially reflective element. Furthermore, the method comprises passing on a second portion of the oscillation signal as a forward signal via the second line section to the second terminal by means of the partially reflective element. The method furthermore comprises outputting the reflected signal via a second port of a directional coupler of the first integrated radar circuit to a signal node of the first integrated radar circuit. A first port of the directional coupler is coupled to the first terminal. Furthermore, the method comprises generating radar transmission signals on the basis of the reflected signal by means of at least one portion of the first transmission paths coupled to the signal node.

The cascading of a plurality of MMICs makes it possible to use more reception and/or transmission antennas for radar scanning. Correspondingly, it is possible to achieve e.g. an improvement in the radar image with regard to the azimuth angle resolution and/or the elevation angle resolution. Exemplary embodiments of the proposed synchronization architecture can enable the use of a maximum number of available transmission paths for the coupling of antennas instead of for synchronization. This may be particularly advantageous e.g. in the case of relatively small systems having just two or three cascaded MMICs. As already explained above, the phase synchronization in the radiofrequency range is important for cascaded MMICs. The proposed synchronization architecture can enable a synchronization by means of a feedback of reflected signals to the master MMIC. In contrast to existing approaches, one terminal of the master MMIC is sufficient for the synchronization, such that additional antennas and/or transmission paths can be used for the actual radar scanning.

The aspects and features that have been described together with one or more of the examples and figures described in detail above can also be combined with one or more of the other examples in order to replace an identical feature of the other example or in order additionally to introduce the feature into the other example.

The description and drawings present only the principles of the disclosure. Furthermore, all examples mentioned here are intended to be used expressly only for illustrative purposes, in principle, in order to assist the reader in understanding the principles of the disclosure and the concepts contributed by the inventor(s) for further development of the art. All statements herein regarding principles, aspects and examples of the disclosure and also concrete examples thereof encompass the counterparts thereof.

A block diagram can illustrate for example a rough circuit diagram which implements the principles of the disclosure. In a similar manner, a flow diagram, a flow chart, a state transition diagram, a pseudo-code and the like can represent various processes, operations or steps which are represented for example substantially in a computer-readable medium and are thus performed by a computer or processor, regardless of whether such a computer or processor is explicitly shown. Methods disclosed in the description or in the patent claims can be implemented by a component having a means for performing each of the respective steps of said methods.

It goes without saying that the disclosure of a plurality of steps, processes, operations or functions disclosed in the description or the claims should not be interpreted as being in the specific order, unless this is explicitly or implicitly indicated otherwise, e.g. for technical reasons. The disclosure of a plurality of steps or functions therefore does not limit them to a specific order unless said steps or functions are not interchangeable for technical reasons. Furthermore, in some examples, an individual step, function, process or operation can include a plurality of partial steps, functions, processes or operations and/or be subdivided into them. Such partial steps can be included and be part of the disclosure of said individual step, provided that they are not explicitly excluded.

Furthermore, the claims that follow are hereby incorporated in the detailed description, where each claim can be representative of a separate example by itself. While each claim can be representative of a separate example by itself, it should be taken into consideration that—although a dependent claim can refer in the claims to a specific combination with one or more other claims—other examples can also encompass a combination of the dependent claim with the subject matter of any other dependent or independent claim. Such combinations are explicitly proposed here, provided that no indication is given that a specific combination is not intended. Furthermore, features of a claim are also intended to be included for any other independent claim, even if this claim is not made directly dependent on the independent claim.

What is claimed is:

1. A radar system, comprising:
a first integrated radar circuit having a plurality of first transmission paths and a local oscillator configured to generate a local oscillator signal, wherein the first integrated radar circuit additionally has a first terminal configured to output an oscillation signal based on the local oscillator signal;
a second integrated radar circuit having at least one second transmission path and a second terminal; and
a partially reflective element that is coupled to the first terminal via a first line section and to the second terminal via a second line section, wherein the partially reflective element is configured to reflect back a first portion of the oscillation signal as a reflected signal via the first line section to the first terminal and to pass on a second portion of the oscillation signal as a forward signal via the second line section to the second terminal,
wherein the first integrated radar circuit comprises a directional coupler, which is coupled to the first terminal via a first port and is configured to output the reflected signal via a second port to a signal node of the first integrated radar circuit,
wherein the plurality of first transmission paths are coupled to the signal node, and
wherein at least one portion of the plurality of first transmission paths is configured to generate radar transmission signals on a basis of the reflected signal.

2. The radar system as claimed in claim 1, wherein the at least one portion of the plurality of first transmission paths is configured to generate the radar transmission signals in a manner temporally correlated with the reflected signal, and wherein the at least one second transmission path is coupled to the second terminal and configured to generate another radar transmission signal in a manner temporally correlated with the forward signal.

3. The radar system as claimed in claim 1, wherein the first integrated radar circuit comprises at least one reception path that is coupled to the signal node and is configured to down-convert a radar reception signal using the reflected signal.

4. The radar system as claimed in claim 1, wherein the second integrated radar circuit comprises at least one reception path which is coupled to the second terminal and is configured to down-convert a radar reception signal using the forward signal.

5. The radar system as claimed in claim 1, wherein:
the first integrated radar circuit comprises at least one first reception path that is coupled to the signal node and is configured to down-convert a first radar reception signal using the reflected signal, and
the second integrated radar circuit comprises at least one second reception path which is coupled to the second terminal and is configured to down-convert a second radar reception signal using the forward signal.

6. The radar system as claimed in claim 1, wherein the partially reflective element is configured to generate the reflected signal and the forward signal with a constant phase angle relative to one another.

7. The radar system as claimed in claim 1, wherein the partially reflective element is configured to generate the reflected signal and the forward signal in phase with each other.

8. The radar system as claimed in claim 7, wherein:
the first line section and the second line section have a same length, and
the length of the first line section and of the second line section are such that a phase of the reflected signal upon reception at the first terminal is identical to a phase of the forward signal upon reception at the second terminal.

9. The radar system as claimed in claim 1, wherein respective signal strengths of the reflected signal and of the forward signal deviate from one another by less than 50%.

10. The radar system as claimed in claim 1, wherein respective signal strengths of the reflected signal and of the forward signal are identical.

11. The radar system as claimed in claim 1, wherein the partially reflective element comprises exclusively passive components.

12. The radar system as claimed in claim 1, wherein the directional coupler is a rat-race coupler that comprises the second port and a ring conductor, and wherein a biasable Positive Intrinsic Negative (PIN) diode is arranged between the second port of the rat-race coupler and the ring conductor of the rat-race coupler.

13. The radar system as claimed in claim 1, wherein one of the plurality of first transmission paths is coupled to the first terminal via the directional coupler and is configured to apply the oscillation signal based on the local oscillator signal to the first terminal.

14. The radar system as claimed in claim 1, further comprising:
a third integrated radar circuit having at least one third transmission path and a third terminal,
wherein the partially reflective element is coupled to the third terminal via a third line section,
wherein the partially reflective element is configured to pass on a third portion of the oscillation signal as a further forward signal via the third line section to the third terminal, and
wherein the at least one third transmission path is coupled to the third terminal and is configured to generate a further radar transmission signal in a manner temporally correlated with the further forward signal.

15. The radar system as claimed in claim 14, wherein the partially reflective element is configured to generate the reflected signal, the forward signal, and the further forward signal with a constant phase angle relative to one another.

16. The radar system as claimed in claim 14, wherein the partially reflective element is configured to generate the reflected signal, the forward signal, and the further forward signal in phase with each other.

17. The radar system as claimed in claim 1, wherein:
in a further operating mode, the local oscillator of the first integrated radar circuit is inactive,
the second integrated radar circuit comprises a further local oscillator, which, in the further operating mode, is configured to generate a further local oscillator signal,
the second terminal in the further operating mode is configured to output a further oscillation signal based on the further local oscillator signal,
the partially reflective element in the further operating mode is configured to reflect back a first portion of the further oscillation signal as a further reflected signal via the second line section to the second terminal and to pass on a second portion of the further oscillation signal as a further forward signal via the first line section to the first terminal.

18. The radar system as claimed in claim 17, wherein the at least one portion of the plurality of first transmission paths in the further operating mode is configured to generate the radar transmission signals in a manner temporally correlated with the further forward signal, and wherein the at least one second transmission path in the further operating mode is configured to generate another radar transmission signal in a manner temporally correlated with the further reflected signal.

19. An integrated radar circuit, comprising:
a plurality of transmission paths;
a local oscillator configured to generate a local oscillator signal;
a terminal for linking an external element via a line section, wherein the terminal is configured to output an oscillation signal based on the local oscillator signal to the line section and to receive a portion of the oscillation signal reflected by the external element as a reflected signal via the line section; and
a directional coupler that is coupled to the terminal via a first port and is configured to output the reflected signal via a second port to a signal node of the integrated radar circuit,
wherein the plurality of transmission paths are coupled to the signal node and at least one portion of the plurality of transmission paths is configured to generate radar transmission signals on a basis of the reflected signal.

20. The integrated radar circuit as claimed in claim 19, wherein one of the plurality of transmission paths is coupled to the terminal via the directional coupler and is configured to apply the oscillation signal based on the local oscillator signal to the terminal.

21. The integrated radar circuit as claimed in claim 20, further comprising:
a switch configured to couple the local oscillator to the signal node in a further operating mode,
wherein the one of the plurality of transmission paths in the further operating mode is configured to generate a radar transmission signal on a basis of the local oscillator signal and to output the radar transmission signal to the terminal,
wherein remaining transmission paths of the plurality of transmission paths in the further operating mode are configured to generate the radar transmission signals on the basis of the local oscillator signal.

22. The integrated radar circuit as claimed in claim 19, further comprising:
at least one reception path that is coupled to the signal node and is configured to down-convert a radar reception signal using the reflected signal.

23. A method for a radar system having a first integrated radar circuit comprising a plurality of first transmission paths, a local oscillator, and a first terminal, and a second integrated radar circuit comprising at least one second transmission path and a second terminal, the method comprising:
outputting an oscillation signal based on a local oscillator signal of the local oscillator via the first terminal to a partially reflective element coupled to the first terminal via a first line section and to the second terminal via a second line section;
reflecting back a first portion of the oscillation signal as a reflected signal via the first line section to the first terminal by the partially reflective element;
passing on a second portion of the oscillation signal as a forward signal via the second line section to the second terminal by means of the partially reflective element;
outputting the reflected signal via a first port of a directional coupler of the first integrated radar circuit to a signal node of the first integrated radar circuit, wherein a second port of the directional coupler is coupled to the first terminal; and
generating radar transmission signals on a basis of the reflected signal at least one portion of the plurality of first transmission paths coupled to the signal node.

* * * * *